(12) United States Patent
Casari

(10) Patent No.: US 10,067,027 B2
(45) Date of Patent: Sep. 4, 2018

(54) TEST METHODOLOGY TO REDUCE FALSE REJECTIONS AND INCREASE NUMBER OF CONTAINERS TESTED FOR TIGHTNESS

(71) Applicant: Robert Bosch GmbH, Stuttgart (DE)

(72) Inventor: John P. Casari, Manchester, MI (US)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 15/061,540

(22) Filed: Mar. 4, 2016

(65) Prior Publication Data

US 2017/0254721 A1 Sep. 7, 2017

(51) Int. Cl.
*G01M 3/00* (2006.01)
*G01M 3/32* (2006.01)
*F02D 41/38* (2006.01)
*F02D 41/22* (2006.01)

(52) U.S. Cl.
CPC ....... *G01M 3/3263* (2013.01); *F02D 41/3809* (2013.01); *G01M 3/002* (2013.01); *G01M 3/32* (2013.01); *F02D 2041/225* (2013.01)

(58) Field of Classification Search
CPC .............. F02D 2041/225; F02D 41/38; F02D 41/3809; G01M 3/00; G01M 3/002; G01M 3/26; G01M 3/32; G01M 3/3263
See application file for complete search history.

(56) References Cited

U.S. PATENT DOCUMENTS

| | | | |
|---|---|---|---|
| 7,472,581 B2 | 1/2009 | Kitazawa et al. | |
| 7,899,629 B2 | 3/2011 | Behrends | |
| 9,091,612 B2 | 7/2015 | Lehmann | |
| 9,395,263 B2 * | 7/2016 | Wang | G01M 3/34 |
| 2008/0307858 A1 | 12/2008 | McManus et al. | |
| 2011/0197659 A1 | 8/2011 | Palten et al. | |
| 2014/0311222 A1 | 10/2014 | Decker et al. | |
| 2015/0307365 A1 * | 10/2015 | Baird | G01M 3/26 210/236 |

(Continued)

FOREIGN PATENT DOCUMENTS

DE 10006185 C1 6/2001
EP 0974826 A2 1/2000

OTHER PUBLICATIONS

International Search Report and Written Opinion for Application No. PCT/EP2017/053895 dated Jun. 21, 2017 (12 pages).

*Primary Examiner* — Nguyen Ha
(74) *Attorney, Agent, or Firm* — Michael Best & Friedrich LLP

(57) ABSTRACT

A method and system of testing a tightness of a closed container using a two-part test. The first part of the two-part test includes connecting the closed container to a gas supply and filing the closed container with a testing gas from the gas supply. A first leak rate of the closed container is measured over a first period of time, and when the first leak rate is less than a first threshold, the controller identifies the closed container as compliant. Conversely, when the first leak rate is greater than the first threshold, the controller measures a second leak rate of the closed container over a second period of time. When the second leak rate is greater than a second threshold, the controller identifies the closed container as noncompliant, and when the second leak rate is less than the second threshold, the controller identifies the closed container as compliant.

21 Claims, 8 Drawing Sheets

(56) References Cited

U.S. PATENT DOCUMENTS

| | | | | |
|---|---|---|---|---|
| 2015/0354347 A1* | 12/2015 | Franklin | ................ | G01M 3/28 |
| | | | | 702/51 |
| 2017/0030281 A1* | 2/2017 | Willis | .................... | F02D 41/22 |
| 2017/0030820 A1* | 2/2017 | Ascheman | ......... | G01N 15/0826 |
| 2017/0254719 A1* | 9/2017 | Franklin | ................ | G01M 3/26 |
| 2017/0260930 A1* | 9/2017 | Weigl | ................ | F02M 25/0818 |

* cited by examiner

TEST METHODOLOGY TO REDUCE FALSE REJECTIONS AND INCREASE NUMBER OF CONTAINERS TESTED FOR TIGHTNESS

BACKGROUND

Embodiments of the invention relate to methods and systems of measuring leak rates in closed containers.

SUMMARY

One embodiment provide a method of testing tightness of a closed volume for a plurality of containers (e.g., fuel rails). In one example, the method involves performing a low-leakage rate test to detect containers with low-leakage rates. The low-leakage rate test is performed at a leakage rate substantially below an allowable leakage rate (i.e., within acceptable tolerances). Containers that fail the low-leakage rate test undergo a leakage rate test involving longer testing times and a leakage rate near the allowable leakage rate. Containers that pass the low-leakage rate test do not need to be tested with the slower, high-leakage rate testing.

One embodiment provides a method of testing a closed container for tightness including connecting the closed container to a gas supply and filling the closed container with a testing gas from the gas supply. A controller measures a first leak rate of the closed container over a first period of time. When the first leak rate is less than a first threshold, the controller identifies the closed container as compliant. When the first leak rate is greater than the first threshold, the controller measures a second leak rate of the closed container over a second period of time. When the second leak rate is greater than a second threshold, the controller identifies the closed container as noncompliant, and when the second leak rate is less than the second threshold, the controller identifies the closed container as compliant.

Another embodiment provides a system for testing a closed container for tightness. The system includes a gas supply section, a pressure sensor, and a controller including an electronic processor and a memory. The controller is configured to fill the closed container with a testing gas from the gas supply and measure a first leak rate of the closed container over a first period of time. When the first leak rate is less than a first threshold, the controller identifies the closed container as compliant. When the first leak rate is greater than the first threshold, the controller fills the closed container with the testing gas from the gas supply and measures a second leak rate of the closed container over a second period of time. When the leak rate is greater than a second threshold, the controller identifies the closed container as noncompliant. When the leak rate is less than the second threshold, the controller identifies the closed container as compliant.

Other aspects of various embodiments will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement various embodiments. In addition, it should be understood that certain embodiments may include hardware, software, and electronic components or modules that, for purposes of discussion, may be illustrated and described as if certain components were implemented solely in hardware. However, one of ordinary skill in the art, based on a reading of this detailed description, would recognize that, in at least one embodiment, aspects may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification may include one or more electronic processors, one or more memory modules including non-transitory computer-readable medium, one or more input/output interfaces, and various connections (e.g., a system bus, conductive tracks, wires, and the like) connecting the components.

Figure 1:
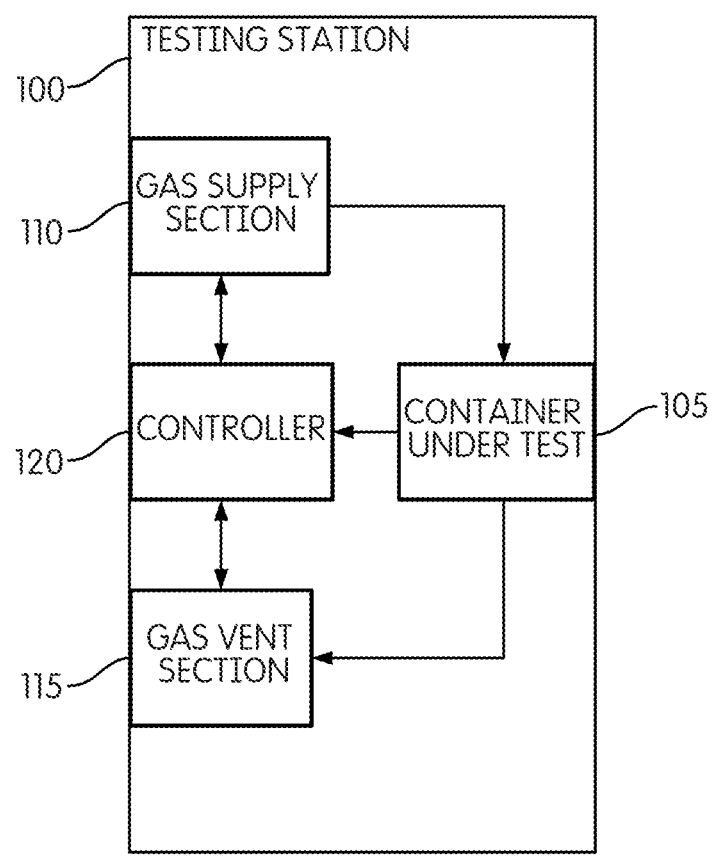
FIG. 1 is a block diagram of a testing station for tightness testing of a device under test according to one embodiment.

FIG. 1 illustrates a testing station 100 for a container under test (e.g., a closed container) 105 according to some embodiments. In some embodiments, the testing station 100 performs a quality check for the container under test 105 and is implemented after manufacture of the container under test 105. The testing station 100 may be incorporated in an assembly line implementing a manufacturing process for the container under test 105. For example, the container under test 105 may enter the testing station 100 via belt, track, conveyor, and the like. Once in the testing station 100, the container under test 105 is tested for tightness. In other words, the container under test 105 is tested to determine a leak rate from inside the container under test 105 to outside the container under test 105. In some embodiments, after the container under test 105 is tested, another container is brought into the testing station 100 and the process repeats.

In other embodiments, the testing station 100 may test a single container. In yet other embodiments, multiple containers may be tested simultaneously by parallel processing equipment.

In the illustrative embodiment, the testing station 100 includes, among other things, a gas supply section 110, and a gas vent section 115. In some embodiments, the gas supply section 110 and the gas vent section 115 share a mechanical connection to the container under test 105. For example, the gas supply section 110 and the gas vent section 115 may both be connected and may use a single connection via tubes, hoses, pipes and the like. In other embodiments, during testing, the gas supply section 110 and the gas vent section 115 are separately coupled to the container under test 105 with tubes, hoses, pipes, and the like via a mechanical connection such as, for example, a quick-disconnect fitting. In addition, the gas supply section 110 and the gas vent section 115 may be separately housed or may both be included in a single monolithic compartment or module.

The gas supply section 110 includes a pathway for supplying testing gas to the container under test 105. When coupled to the container under test 105, the gas supply section 110 may pressurize the container under test 105 with the testing gas. The gas supply section 110 may also include storage (e.g., gas cylinders) for testing gas. Testing gas may include various types of gasses including noble gasses, nitrogen, or others.

The gas vent section 115 includes a pathway for venting the testing gas. When coupled to the container under test 105, the gas vent section 115 may remove the testing gas from the container under test 105. The testing gas may be vented after testing is complete, before testing begins, or between a first part of the testing method and the second part of the testing method as described below. In some embodiments, the gas vent section 115 includes a vacuum pump (not illustrated) for removing the testing gas from the container under test 105.

The testing station 100 also includes a controller 120. The controller 120 is communicatively coupled to the gas supply section 110, the gas vent section 115, and the container under test 105. For example, the controller 120 may have direct or indirect electrical connections with the gas supply section 110 and the gas vent section 115. During testing, the controller 120 may electrically connect to the container under test 105 using a temporary electrical connection. For example, the controller 120 may be electrically connected to the container under test 105 with cables, wires, and the like via a wire harness or plug-type connection.

Figure 2:
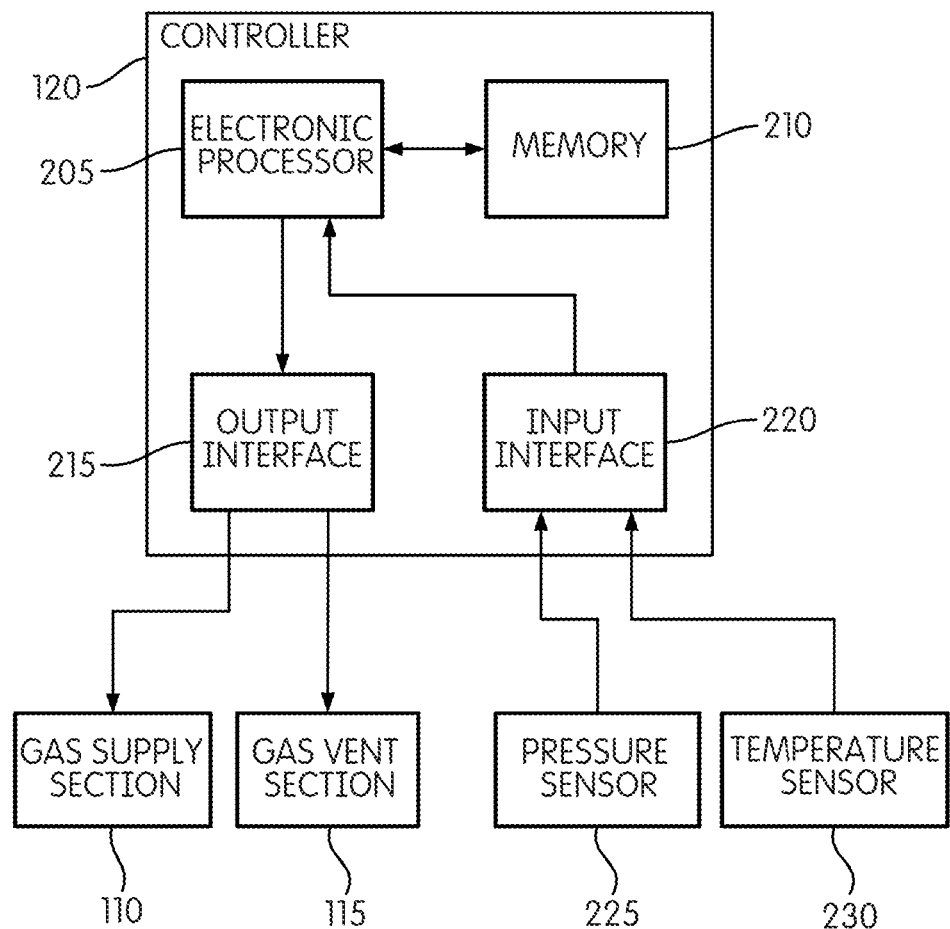
FIG. 2 is a block diagram of a controller for the testing station of FIG. 1 according to one embodiment.

As illustrated in FIG. 2, the controller 120 includes a plurality of electrical and electronic components that provide power, operation control, and protection to the components and modules within the controller 120. The controller 120 includes, among other things, an electronic processor 205 (such as a programmable electronic microprocessor, microcontroller, or similar device), a memory 210 (e.g., non-transitory, machine readable memory), an output interface 215, and an input interface 220. In other embodiments, the controller 120 includes additional, fewer, or different components. The controller 120 may be implemented in several independent controllers each configured to perform specific functions or sub-functions. Additionally, the controller 120 may contain sub-modules that process inputs and outputs and perform related processes.

Components of the controller 120 and associated systems are configured to implement, among other things, processes and methods described herein. For example, the electronic processor 205 is communicatively coupled to the memory 210 and executes instructions which are capable of being stored on the memory 210. The electronic processor 205 is configured to retrieve from memory 210 and execute instructions related the methods of operation of the testing station 100. In some embodiments, the output interface 215 includes drivers, relays, switches, and the like to operate and control the gas supply section 110 and the gas vent section 115 based on instructions from the electronic processor 205.

The controller 120 is communicatively coupled to a pressure sensor 225 and a temperature sensor 230. The pressure sensor 225 and the temperature sensor 230 may be electrically connected to the controller 120 via the input interface 220. In this configuration, the input interface 220 may include input terminals and input hardware- or software-based logic. The input logic detects and processes various input signals including pressure and temperature signals from sensors and electronic devices, such as, for example, resistive sensors, voltage controlled sensors, current controlled sensors, and the like. In particular, the controller 120 receives pressure and temperature signals from the pressure sensor 225 and the temperature sensor 230 respectively. The controller 120 inputs pressure and temperature readings either continuously or at intervals during testing and may perform the methods described herein based on the pressure and temperature readings.

The pressure sensor 225 and the temperature sensor 230 may be physically coupled to and uncoupled from the container under test 105. For example, during testing, the pressure sensor 225 and the temperature sensor 230 may be directly attached to the container under test 105 via a testing apparatus (not shown). In other embodiments, the pressure sensor 225 and the temperature sensor 230 may be located remotely from the container under test 105. In such configurations, the pressure sensor 225 may measure pressure inside the container under test 105 via tubing, piping, fittings, and/or hose connections. Similarly, the temperature sensor 230 may measure temperature remotely using, for example, an infrared temperature sensor.

The pressure sensor 225 is configured to measure gas pressure of the testing gas within the container under test 105. Similarly, the temperature sensor 230 is configured to measure temperature of the testing gas inside the container under test 105, the temperature of the container under test 105, or both. In some embodiments, the controller 120 uses the pressure and temperature readings to achieve steady-state testing conditions prior to measuring leak rates of the container under test 105 as described below.

Figure 3:
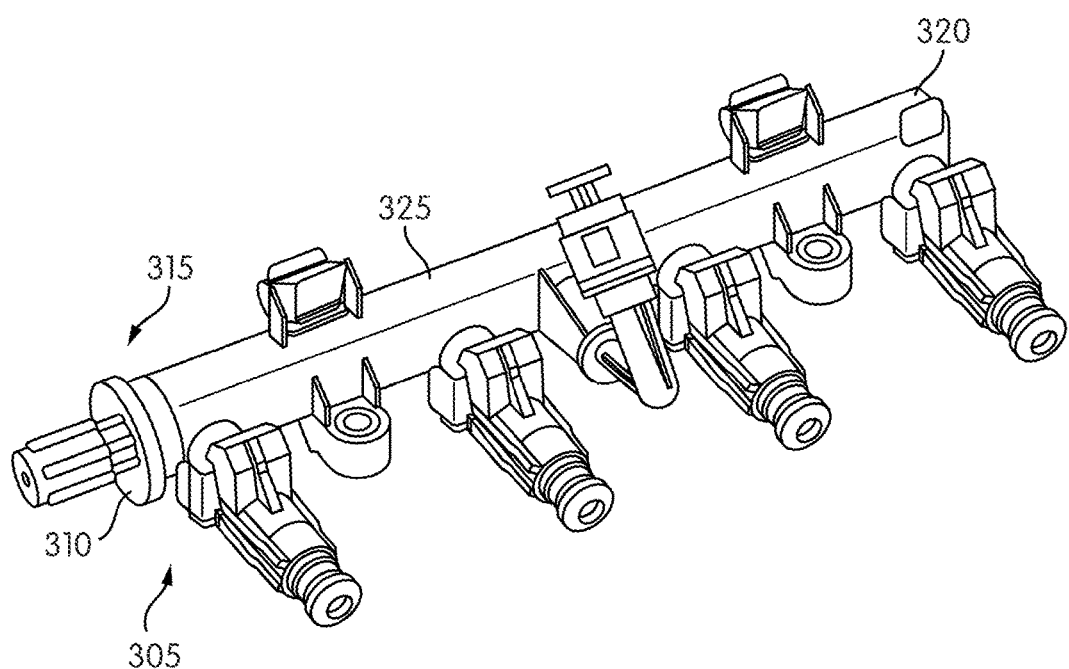
FIG. 3 is a perspective view of the device under test of FIG. 1 according to one embodiment.

FIG. 3 illustrates an example of the container under test 105 according to one embodiment. In general, the container under test 105 may include various types of containers with at least one sealable connection. For example, the container under test 105 may include various containers with a sealable connection, such as, for example, a pipe with a cap or plug; a tube with a sealable fitting, a bottle with a cap, plug or cork; a drum with a lid, and the like. The container under test 105 may be formed from various materials and constructed in various ways. For example, the container under test 105 may be formed of plastic, metal, polymer, or a combination of these materials. Embodiments listed herein are particularly suitable for testing the tightness of various types of containers with zero or very low leak rates.

In the illustrated example, the container under test 105 is a fuel rail assembly 305. The fuel rail assembly 305 is an automotive component that supplies fuel (e.g., gasoline) to cylinders of an engine of a vehicle. Due to strict manufacturing standards, the fuel rail assembly 305 is constructed to have zero or very low leak rates. The fuel rail assembly 305 may be formed from various materials and constructed in various ways. For example, the fuel rail assembly 305 may be formed of plastic, metal, polymer, or a combination of these materials. The fuel rail assembly 305 includes an end cap 310 and a rail tube 325. The end cap 310 is directly coupled to one end 315 of the fuel rail assembly 305. A similar end cap (not illustrated) may be included on an opposite end 320 of the fuel rail assembly 305. The end cap 310 is coupled to the fuel rail assembly 305 during manufacture. The end cap 310 may be coupled to the fuel rail assembly 305 in various ways including a welded joint, a glued (e.g., epoxied) joint, crimp joint with elastomer sealing element, and the like.

Figure 4A:
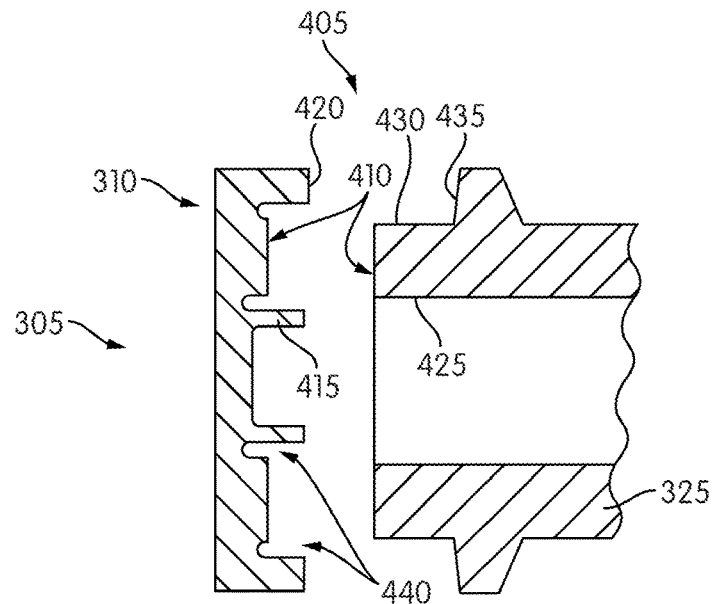
FIG. 4A is a cross-sectional view of a rail tube and end cap for the device under test of FIG. 1 according to one embodiment.

FIG. 4A illustrates a junction 405 between the rail tube 325 and the end cap 310 prior to coupling. For example, the rail tube 325 and the end cap 310 may form an airtight seal when coupled at the junction 405 to form the fuel rail assembly 305 illustrated in FIG. 3. In some embodiments, the junction 405 is formed by a plurality of weld surfaces 410. During assembly, the weld surfaces 410 are pressed together and fused by welding or glue. The end cap 310 may include one or more inner seal surfaces 415 and one or more outer seal surfaces 420. The inner seal surfaces 415 may press against an interior circumferential surface 425 of the rail tube 325. The inner seal surfaces 415 may be cylindrical to match the shape of the rail tube 325. Similarly, the outer seal surfaces 420 may press against an exterior circumferential surface 430 of the rail tube 325 and may also be cylindrical to match the shape of the rail tube 325. The outer seal surfaces 420 may press against and couple to a stop surface 435 of the rail tube 325. Flash traps 440 may be located near the weld surfaces 410. The flash traps 440 may be designed to collect sealing material (e.g., welding flash, glue, epoxy, and the like) from the junction 405 when coupled.

Figure 4B:
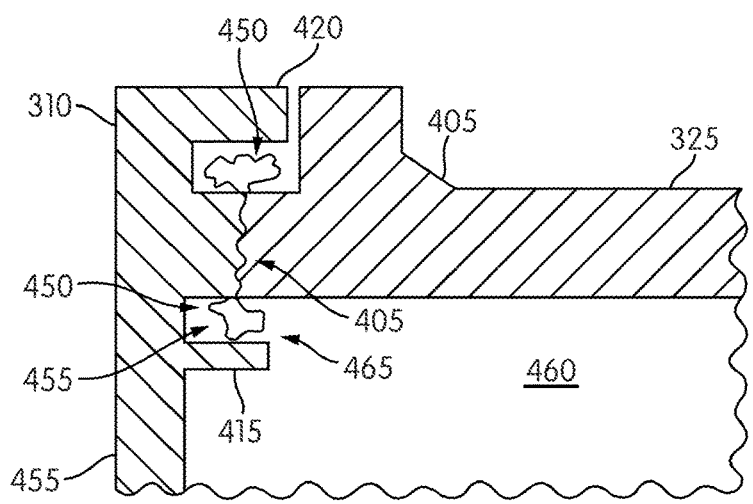
FIG. 4B is a cross-sectional view of the rail tube and the end cap of FIG. 4A after assembly according to one embodiment.

FIG. 4B illustrates a portion of the junction 405 after connection of the rail tube 325 and the end cap 310. Once sealed, the junction 405 includes sealing material 450 deposited in locations including at least the flash traps 440. The sealing material 450 may be a byproduct of the coupling process. The sealing material 450, the inner seal surfaces 415, the outer seal surfaces 420, or a combination of the aforementioned may create a trapped volume 455 or multiple trapped volumes within the fuel rail assembly 305. The trapped volume 455 may be formed by sealing material 450 that completely or partially isolates the trapped volume 455 from an interior volume 460 of the fuel rail assembly 305. For example, the trapped volume 455 may be isolated from the interior volume 460 such that an airtight seal is formed between the trapped volume 455 and the interior volume 460. In another example, the trapped volume 455 may be partially isolated such that an internal leak (e.g., a pinhole-sized pathway) 465 forms between the trapped volume 455 and the interior volume 460.

Figure 5:
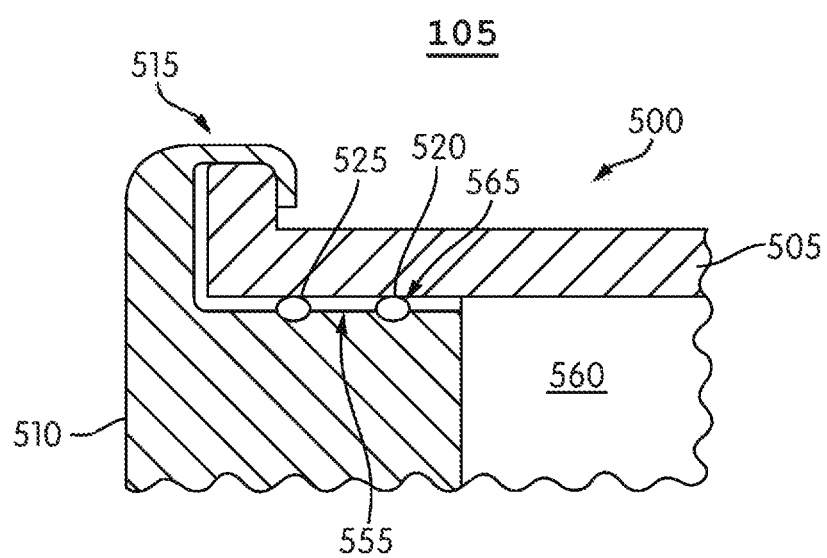
FIG. 5 is a cross-sectional view of a dual O-ring seal of the device under test of FIG. 1 according to one embodiment.

FIG. 5 illustrates a sealable junction 500 according to one embodiment. The sealable junction 500 may be used for connections of the container under test 105, the fuel rail assembly 305, or another type of container. In the illustrative example, the sealable junction 500 is formed, at least in part, by one or more O-rings and a crimped connection. In particular, a container body 505 (e.g., a rail tube) is physically coupled to a lid 510 (e.g., an end cap). The lid 510 is affixed to the container body 505 via a crimp joint 515. A first O-ring 520 and a second O-ring 525 are positioned between the container body 505 and the lid 510. The first O-ring 520 provides a first seal between an interior volume 560 and outside of the container body 505. The second O-ring 525 provides a second seal between the interior volume 560 and the outside of the container body 505. In this way, the first O-ring 520 and the second O-ring 525 provide a dual sealing mechanism in which either of the first O-ring 520 or the second O-ring 525 may be sufficient to provide an airtight seal between the interior volume 560 and the outside of the container body 505. As a consequence, combination of the first O-ring 520 and the second O-ring 525 generally provides a seal with lower leak rates than a seal with a single O-ring.

A trapped volume 555 may be formed between the first O-ring 520, the second O-ring 525, the container body 505, and the lid 510. The trapped volume 555 may be isolated from the interior volume 560 (e.g., when the first O-ring 520 forms an airtight seal). Similarly, the trapped volume 555 may be isolated from the outside of the container body 505 (e.g., when the second O-ring 525 forms an airtight seal). In some cases, the first O-ring 520 does not provide an airtight seal between the interior volume 560 and the trapped volume 555. This may occur in containers where the first O-ring 520 is not properly seated or twisted, when the first O-ring 520 or sealing surface has defects, when foreign matter enters the sealable junction 500, and like conditions. In such cases, an internal leak 565 may exist between the interior volume 560 and the trapped volume 555.

In the examples illustrated in FIGS. 4B and 5, the trapped volume 455, 555 and the interior volume 460, 560 may equalize in pressure due to the lack of an airtight seal. For example, when testing gas is supplied to the interior volume 460, 560 during tightness testing, the testing gas may leak into the trapped volume 455, 555. The testing gas may leak into the trapped volume 455, 555 until the gas pressure in the trapped volume 455, 555 equalizes with the gas pressure in the interior volume 460, 560. Depending on a size of the internal leak 465, 565, the exchange of testing gas and the equalization of pressure happens over different time periods. As a consequence, determination of leak rates based on measured pressure changes of the interior volume 460, 560 over set periods of time may be adversely affected. In some cases, due to a small-sized internal leak 465, 565 between the trapped volume 455, 555 and the interior volume 460, 560, the exchange of testing gas and the equalization of pressure may happen quite slowly. In these cases, measuring times for determination of the leak rate may be extended.

Figure 6A:
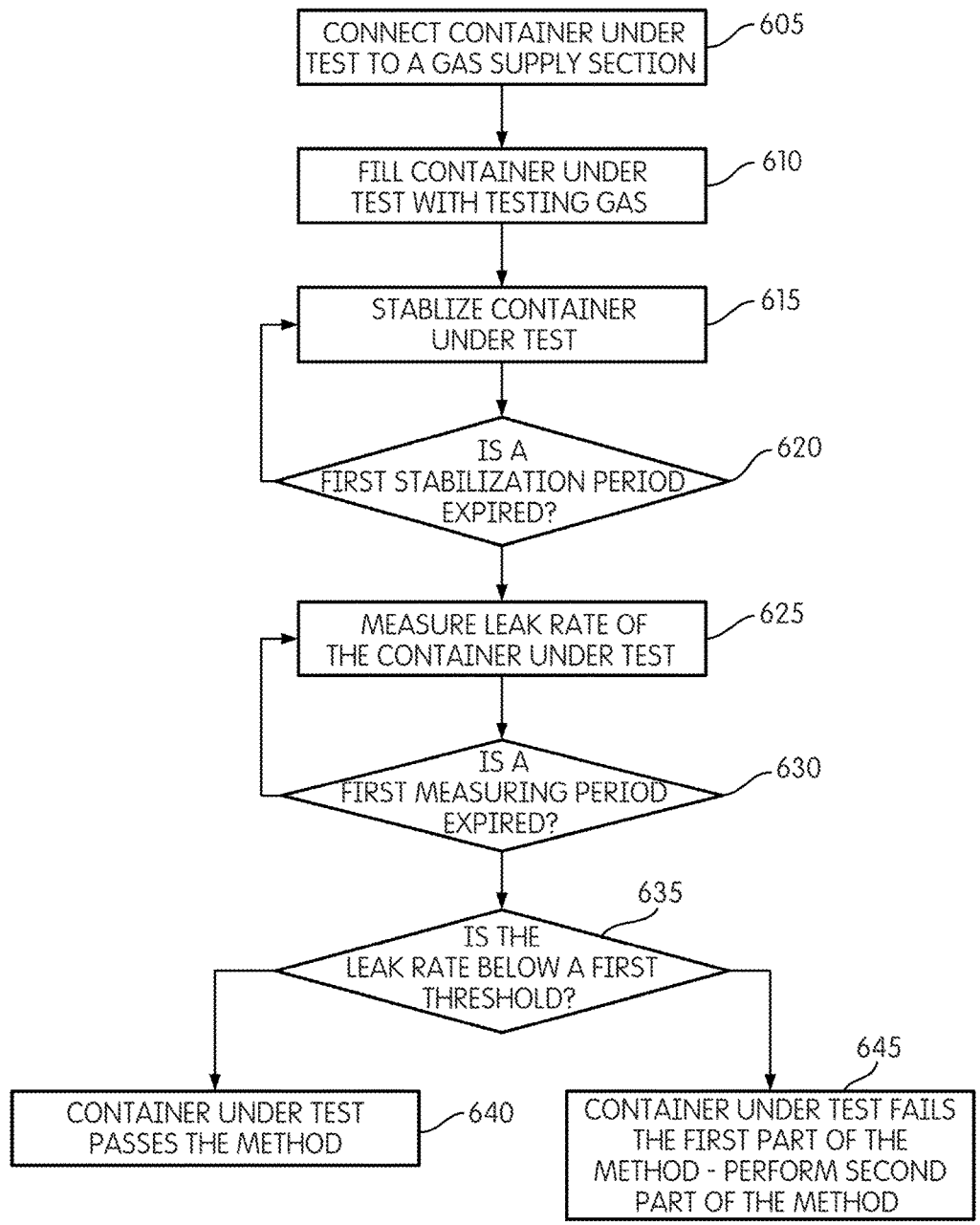
FIGS. 6A and 6B are flowcharts that illustrate a method of tightness testing of the device under test of FIG. 1 according to one embodiment.

FIGS. 6A and 68 illustrate a method 600 of testing the tightness of the container under test 105. The method 600 includes a two-part test for testing containers under test 105 that may or may not include the trapped volume 455, 555 and the internal leak 465, 565. FIG. 6A illustrates a first part of the method 600 of tightness testing designed to distinguish containers with low leak rates from containers with either high leak rates or those with the trapped volume 455, 555 and the internal leak 465, 565. In particular, the first part of the method 600 is designed to quickly determine whether the container under test 105 is within compliance (e.g., whether the container under test 105 meets or exceeds higher than required quality standards of tightness). In other words, when the first part of the method 600 indicates a low leak rate, the controller 120 identifies the container under test 105 as compliant. Conversely, FIG. 68 illustrates a second part of the method 600 of tightness testing designed to test containers with moderate leak rates and those with the trapped volume 455, 555 and the internal leak 465, 565. The second part of the method 600 is designed to determine whether the container under test 105 has a leak rate under a maximum allowable leak rate, and thus within compliance. In other words, when the second part of the method 600 indicates a low leak rate, the controller 120 identifies the container under test 105 as compliant.

In the first part of the method 600 as illustrated in FIG. 6A, the container under test 105 is connected to the gas supply section 110 (block 605). Once connected, the container under test 105 is filled with testing gas from the gas supply section 110. In some embodiments, the controller 120 controls the filling of the container under test 105 to a predetermined test pressure (block 610). For example, the container under test 105 is filled until the testing gas reaches the predetermined pressure as indicated by the pressure sensor 225. In other embodiments, the container under test 105 is filled for a first fill period determined by the controller 120 (e.g., based on mechanical, electronic, or programmed timers within the controller 120). When the container under test 105 is filled with testing gas, the controller 120 disconnects the supply of testing gas (e.g., via an actuator) and begins stabilizing the container under test 105 (block 615). The container under test 105 is stabilized for a period of time so that the temperature of the testing gas inside the container under test 105 equalizes (e.g., approach an approximately steady-state condition) with the container under test 105 and the ambient temperature. In some embodiments, the controller 120 monitors the temperature sensor 230, the pressure sensor 225, or both to determine when the container under test 105 is stabilized. For example, the controller 120 may determine that stabilization has occurred when the measured temperature reaches a temperature set point (e.g., equals the ambient temperature) and when the measured pressure reaches a pressure set point. In other embodiments, the controller 120 initiates a counter and determines that the container under test 105 is stabilized after a first stabilization period. In this embodiment, the controller 120 determines whether the first stabilization period has expired (block 620). When the first stabilization period has not ended, the controller 120 continues to stabilize the container under test 105.

Next, the controller 120 measures the leak rate of the container under test 105 (block 625). Measuring the leak rate may include monitoring the pressure sensor 225 and in some embodiments, the temperature sensor 230, to determine a change in pressure of the testing gas inside the container under test 105. The leak rate is measured until the controller 120 determines when the first measuring period is expired (block 630). Measuring the first leak rate of the container under test 105 over the first measuring period may include performing a fast leak rate test as compared to the second measuring period as described below. When the first measuring period expires, the controller 120 determines whether the leak rate is below a first threshold (block 635). When the leak rate is below the first threshold, the container under test 105 completes the method 600 of testing the tightness of the container under test 105 and is determined to be in compliance (i.e., tolerance) (block 640). Conversely, when the leak rate is above the first threshold, the controller 120 performs the second part of the method 600 of testing the tightness of the container under test 105 to determine whether it is in compliance (block 645).

In the second part of the method 600, the controller 120 optionally vents the testing gas from container under test 105 via the gas vent section 115 (block 650). In some embodiments, the testing gas is not vented between the first part of the method 600 and the second part of the method 600. When not vented, testing gas is added via the gas supply section 110 until the pressure sensor 225 indicates that the gas pressure is adequate for the second part of the method 600. In either case, the container under test 105 is filled with testing gas via the gas supply section 110 (block 655). The controller 120 determines when to stop filling the container under test 105 with testing gas. Similar to the first part of the method 600, the controller 120 may perform this determination based on the pressure sensor 225 or based on a predetermined fill time. Once the container under test 105 is filled, the controller 120 stabilizes the container under test 105 (block 660). To stabilize the container under test 105, in some embodiments, the controller 120 waits a predetermined amount of time (block 665), while in other embodiments, the controller 120 measures a pressure and temperature of the container under test 105 or the pressure and temperature of the testing gas to determine when the container under test 105 is stabilized.

Once the container under test 105 is stabilized, the controller 120 measures the leak rate of the container under test 105 (block 670). The controller 120 measures the leak rate over a second measuring period. The second measuring period may occur over a longer period of time than the first measuring period from the first part of the method 600 and, in this way, may be considered a slow leak rate test as compared to the first part of the method 600. As a consequence, the second part of the method 600 takes a longer amount of time than the first part of the method 600. The controller 120 determines whether the second measuring period has expired (block 675). When the second measuring period has expired, the controller 120 determines whether the second leak rate is below a second threshold (block 680). The second threshold may be a value of a maximum allowable leak rate that conform with manufacturing or quality standards for the particular container under test 105. When the second leak rate is below the second threshold, the container under test 105 is determined to be in compliance and therefore, passes the second part of the method 600 (block 685). Conversely, when the second leak rate is above the second threshold, the container under test 105 is determined to be out of compliance, and therefore fails the second part of the method 600 (block 680). As a consequence, the container under test 105 is either scrapped or reworked and retested. In this case, the container under test 105 may be inspected for leaks using a bubble test or other leak detection method. When a leak is detected, the container under test 105 may be, in some cases, repaired and then subjected to retesting via the method 600.

Due to the short measuring period, the first part of the method 600 is designed to pass containers that do not contain the trapped volume 455, 555 and the internal leak 465, 565. When the container under test 105 contains a trapped volume 455, 555, the measuring stage may indicate that the leak rate of the container under test 105 is greater than in actuality. For example, when the container under test 105 contains the trapped volume 455, 555 and the internal leak 465, 565, the controller 120 may measure a drop in pressure of the interior volume 460, 560 caused from testing gas leaking through to the trapped volume 455, 555. This may falsely indicate a leak rate above the maximum allowable leak rate. When this occurs, the container under test 105 is tested using the second part of the method 600, which provides additional testing time to allow the pressure of the testing gas in the interior volume 460, 560 and the trapped volume 455, 555 to equalize. In this way, only containers with moderate leak rates or those with the interior volume 460, 560 and the internal leak 465, 565 are subject to longer measuring and stabilization periods to accurately determine whether the actual leak rate is in compliance with quality standards.

Conversely, when the container under test 105 does not include a trapped volume 455, 555 or when the trapped volume 455, 555 is completely sealed from the interior volume 460, 560, the measured leak rate indicates leakage from the interior volume 460, 560 to the outside of the container under test 105. As a consequence, the leak rate is not influenced by the trapped volume 455, 555 and the measured leak rate is a more accurate indication of the actual leak rate of the container under test 105. As such, in the first part of the method 600, the measured leak rate of a container without the trapped volume 455, 555 may be lower than a container with an internal leak to the trapped volume 455, 555 even when the container has the same actual leak rate. Therefore, the second part of the method 600 is adapted to test the container with the trapped volume 455, 555 and may determine that the container with an internal leak to the trapped volume 455, 555 is compliant even when it did not pass the first part of the method 600.

Often, many containers will be found compliant under the first part of the method 600 and will not need to be tested using the second part of the method 600. This shortens overall testing times, since the first part of the method 600 is performed faster than the second part of the method. In particular, the first part of the method 600 has significantly shorter measuring periods and may have significantly shorter stabilizing periods. This is because containers with low leak rates are readily distinguished in a short period of time. In this way, containers that pass the first part of the method 600 are tested quickly and therefore, testing a batch of containers that includes at least some containers that pass the first part of the method 600 is faster than if all of the containers are tested with the second part of the method 600.

Figure 7:
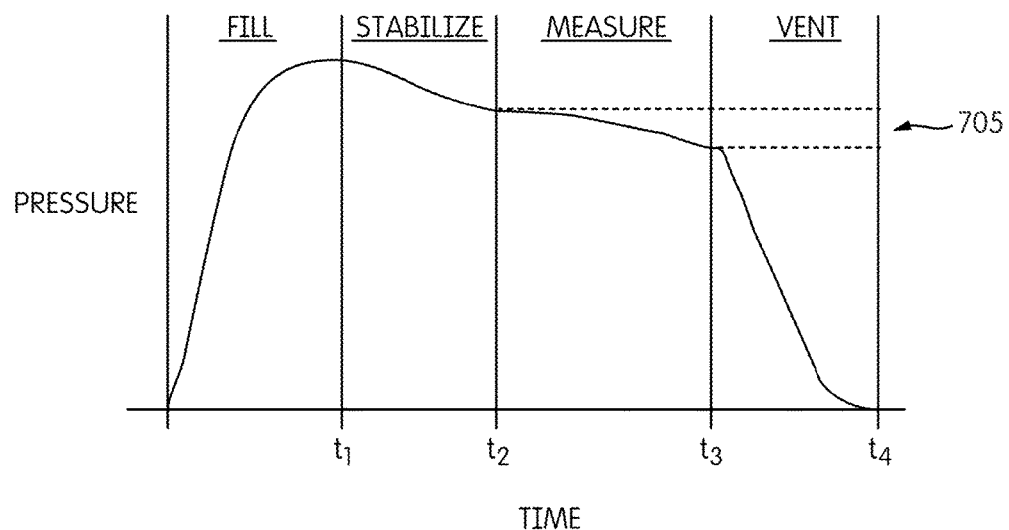
FIG. 7 is a graph of pressure versus time for a first part of the method of tightness testing of FIGS. 6A and 6B according to one example.

FIG. 7 illustrates an example of a graph of pressure versus time for the container under test 105 during the first part of the method 600 (See FIG. 6A). The pressure of the testing gas inside the container under test 105 is plotted on the y-axis. Time is plotted on the x-axis. The first part of the method 600 includes four distinct stages: filling period (represented by $t_1$), stabilizing period (represented by $t_2$), measuring period (represented by $t_3$), and venting period (represented by $t_4$). During the filling stage, the pressure of the testing gas increases as testing gas is supplied to the container under test 105. During the stabilizing stage, the pressure decreases as the temperature of the testing gas stabilizes to a temperature of the container under test 105. As a consequence, adiabatic effects that may influence the measuring stage are dissipated in the stabilization stage. Once the temperatures of the testing gas and the container under test 105 equalize, the controller 120 measures the pressure decay (i.e., pressure drop) inside the container under test 105 over the measuring stage as indicated by dashed lines 705. The controller 120 may then store the measured pressure decay in the memory 210. During the venting stage, the controller 120 vents the container under test 105 via the gas vent section 115 and the pressure of the testing gas is quickly reduced.

Since, the pressure decay is proportional to the leak rate, the controller 120 determines a leak rate based on the pressure decay during the measuring stage. The controller 120 calculates the leak rate based on a predetermined internal volume of the container under test 105 that is preprogrammed into the memory 210. The leak rate that is determined by the controller 120 may include both a relatively constant leak rate from the interior volume 460, 560 to the outside of the container under test 105 and a transitory leak rate from the interior volume 460, 560 to the trapped volume 455, 555 of the container under test 105. When a combined amount of leak rate both from the leak rate from the interior volume 460, 560 to the outside of the container under test 105 and from the leak rate from the interior volume 460, 560 to the trapped volume 455, 555 is less than the first threshold, the container under test 105 passes the first part of the method 600. The first threshold is set at a value substantially less than a maximum value of allowable leak rate. For example, when testing the fuel rail assembly 305, the first threshold may be set to 1.0 standard cubic centimeter per minute (SCCM) or less even when the maximum allowable leak rate may be 1.5 SCCM or greater. As a consequence, when containers pass the first part of the method 600, the containers are considered low-leak rate containers.

Figure 6B:
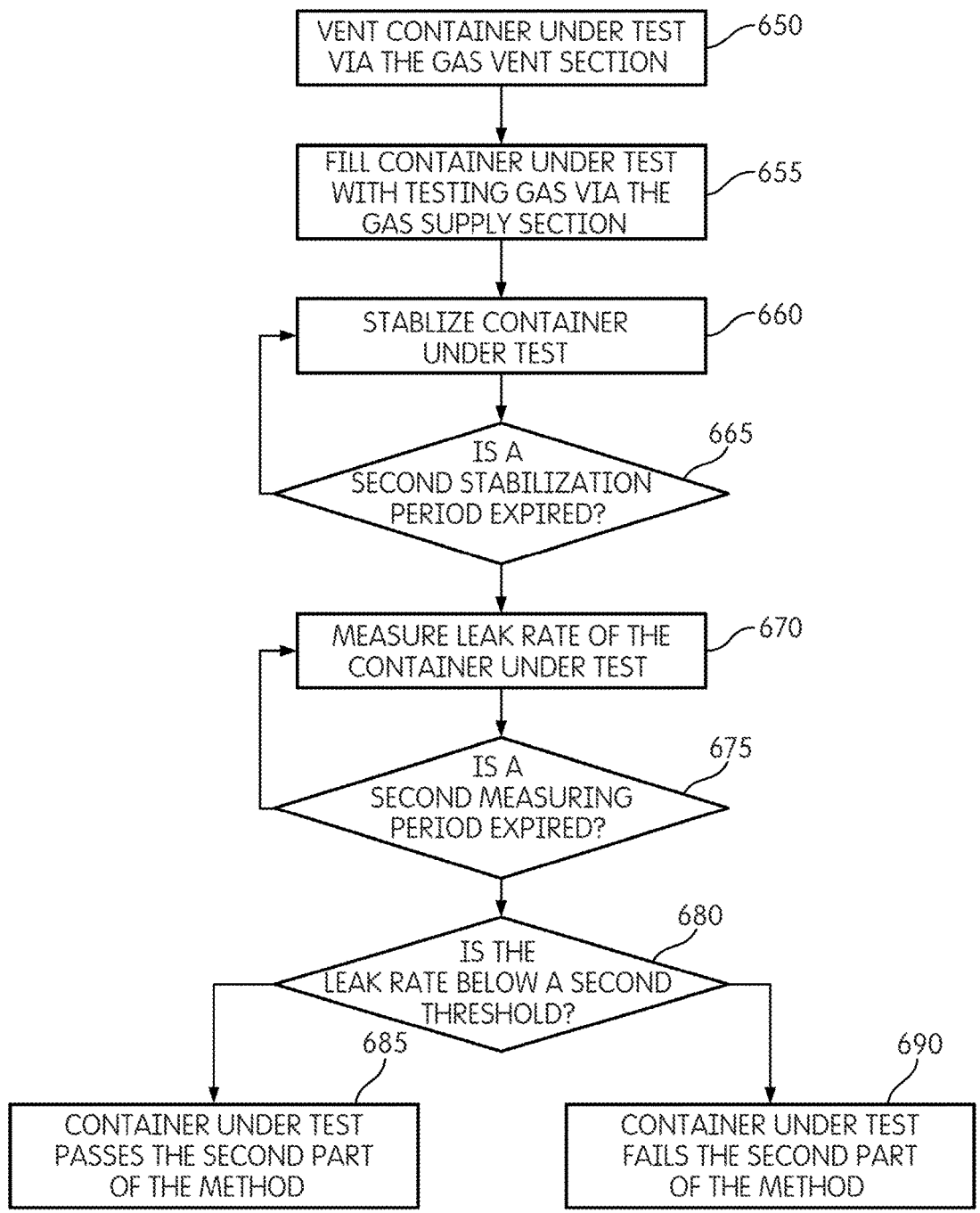
Figure 8:
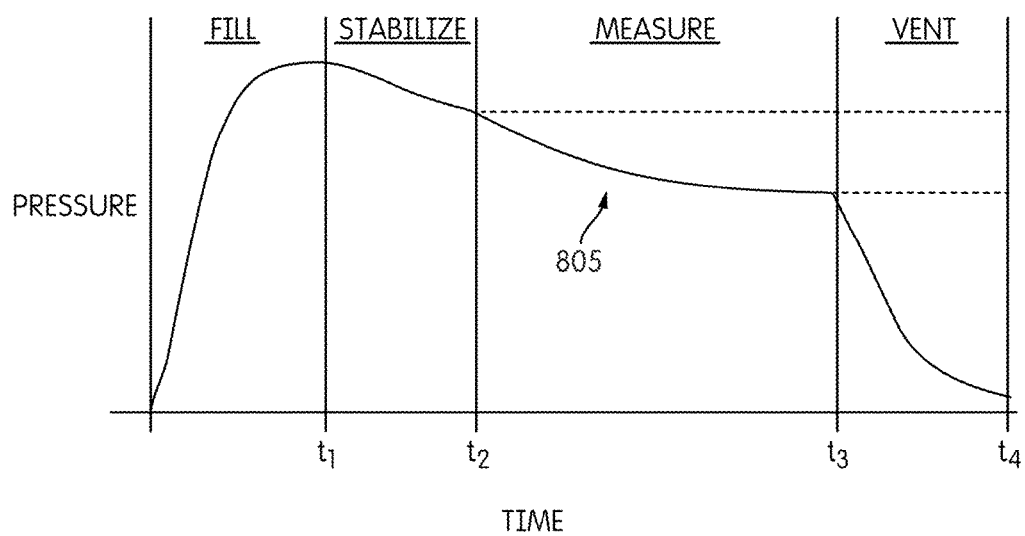
FIG. 8 is a graph of pressure versus time for a second part of the method of tightness testing of FIGS. 6A and 6B according to another example.

FIG. 8 illustrates an example of a graph of pressure versus time for the container under test 105 with the trapped volume 455, 555 and the internal leak 465, 565 during the second part of the method 600 (See FIG. 6B). FIG. 8 is similar to the graph depicted in FIG. 7 with similar stages and behavior of the testing gas and the container under test 105. However, the second test includes a measuring stage (e.g., time period between $t_2$ and $t_3$) that is substantially longer than the measuring stage in the first part of the method 600. As illustrated by the curve 805, the pressure of the testing gas drops more rapidly in the early part than in the later part of the measuring stage. The steeper drop in pressure is due to the internal leak 465, 565 combined with the leak to the outside of the container. Once the pressure in the trapped volume 455, 555 equalizes with the pressure in the interior volume 460, 560, the measured pressure decay lessens and becomes indicative of the actual leak rate. The controller 120 measures the pressure decay during the measuring stage and therefore, may generate the curve 805. Based on the behavior of this curve 805, the controller 120 determines the actual leak rate of the container under test 105. As a consequence, the second part of the method 600 may take substantially longer, but may be more accurate, than the first part of the method 600. As a consequence, the controller 120 may set the second threshold at a maximum allowable leak rate for compliance during the second part of the method 600. For example, the second threshold may be set at a value of 1.5 SCCM when the first threshold is set at a value of 1.0 SCCM for testing the fuel rail assembly 305.

Thus, certain embodiments provide, among other things, a system and method for testing the tightness of a container using a two-part test. Features and advantages of various embodiments are set forth in the following claims.

What is claimed is:

1. A method of testing a closed container for tightness, the method comprising:

connecting the closed container to a gas supply;

filling the closed container with a testing gas from the gas supply;

measuring, by a controller, a first leak rate of the closed container over a first period of time;

when the first leak rate is less than a first threshold, identifying the closed container as compliant;

when the first leak rate is greater than the first threshold, filling the closed container with the testing gas from the gas supply;

measuring a second leak rate of the closed container over a second period of time;

when the second leak rate is greater than a second threshold, identifying the closed container as non-compliant; and when the second leak rate is less than the second threshold, identifying the closed container as compliant.

2. The method of claim 1, the method further comprising: stabilizing the closed container to a first gas pressure set point and a first temperature set point prior to measuring the first leak rate.

3. The method of claim 1, the method further comprising: stabilizing the closed container to a second gas pressure set point and a second temperature set point prior to measuring the second leak rate.

4. The method of claim 1, the method further comprising: stabilizing the closed container based on a first predetermined amount of time prior to measuring the first leak rate.

5. The method of claim 4, the method further comprising: stabilizing the closed container based on a second predetermined amount of time prior to measuring the second leak rate.

6. The method of claim 5, wherein stabilizing the closed container based on the second predetermined amount of time occurs over an amount of time that is greater than the first predetermined amount of time.

7. The method of claim 1, wherein measuring the first leak rate of the closed container over the first period of time includes performing a fast leak rate test.

8. The method of claim 1, wherein measuring the second leak rate of the closed container over the second period of time includes performing a slow leak rate test.

9. The method of claim 1, wherein measuring the second leak rate of the closed container over the second period of time occurs over a period of time that is greater than the first period of time.

10. The method of claim 1, wherein identifying the closed container as noncompliant when the second leak rate is greater than the second threshold is performed with the second threshold being greater than the first threshold.

11. The method of claim 1, wherein identifying the closed container as compliant when the first leak rate is less than the first threshold occurs when the closed container does not include an internal leak.

12. The method of claim 1, wherein identifying the closed container as compliant when the second leak rate is less than the second threshold occurs when the closed container includes an internal leak.

13. The method of claim 1, wherein measuring the first leak rate of the closed container over the first period of time is performed by measuring a change in gas pressure of the testing gas over the first period of time.

14. The method of claim 1, wherein measuring the second leak rate of the closed container over the second period of time is performed by measuring a change in gas pressure of the testing gas over the second period of time.

15. A system for testing a closed container for tightness, the system comprising:
a gas supply section;
a pressure sensor;
a controller including an electronic processor and a memory, the controller configured to
fill the closed container with a testing gas from the gas supply;
measure a first leak rate of the closed container over a first period of time;
when the first leak rate is less than a first threshold, identify the closed container as compliant;
when the first leak rate is greater than the first threshold,
fill the closed container with the testing gas from the gas supply;
measure a second leak rate of the closed container over a second period of time;
when the second leak rate is greater than a second threshold, identify the closed container as noncompliant; and
when the leak rate is less than the second threshold, identify the closed container as compliant.

16. The system of claim 15, further comprising:
a gas vent section configured to vent the testing gas from the closed container between when the first leak rate and the second leak rate are measured.

17. The system of claim 15, wherein the controller is configured to
stabilize the closed container based on a first predetermined amount of time prior to measuring the first leak rate and
stabilize the closed container based on a second predetermined amount of time prior to measuring the second leak rate.

18. The system of claim 17, wherein the first predetermined amount of time is shorter than the second predetermined amount of time.

19. The system of claim 15, wherein the first period of time is shorter than the second period of time.

20. The system of claim 15, wherein the first threshold is less than the second threshold.

21. The system of claim 15, wherein the closed container has a trapped volume that is isolated from an interior volume of the container and from outside of the container.

* * * * *